United States Patent
Natanzon et al.

(10) Patent No.: US 11,263,087 B2
(45) Date of Patent: Mar. 1, 2022

(54) METHODS AND SYSTEMS FOR SERVERLESS DATA DEDUPLICATION

(71) Applicant: EMC IP Holding Company LLC, Hopkinton, MA (US)

(72) Inventors: Assaf Natanzon, Tel Aviv (IL); Saar Cohen, Mishmeret (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 193 days.

(21) Appl. No.: 16/028,324

(22) Filed: Jul. 5, 2018

(65) Prior Publication Data
US 2020/0012569 A1    Jan. 9, 2020

(51) Int. Cl.
| | | |
|---|---|---|
| *G06F 16/20* | (2019.01) | |
| *G06F 11/14* | (2006.01) | |
| *G06F 16/22* | (2019.01) | |
| *G06F 16/28* | (2019.01) | |
| *G06F 16/174* | (2019.01) | |

(52) U.S. Cl.
CPC ...... *G06F 11/1453* (2013.01); *G06F 11/1451* (2013.01); *G06F 16/1748* (2019.01); *G06F 16/221* (2019.01); *G06F 16/2219* (2019.01); *G06F 16/2255* (2019.01); *G06F 16/289* (2019.01)

(58) Field of Classification Search
None
See application file for complete search history.

(56) References Cited

U.S. PATENT DOCUMENTS

| | | | |
|---|---|---|---|
| 9,442,806 B1* | 9/2016 | Bardale | G06F 3/067 |
| 9,734,156 B1* | 8/2017 | Bajpai | G06F 16/1752 |
| 9,971,783 B2* | 5/2018 | Bolte | G06F 16/1748 |
| 9,984,088 B1* | 5/2018 | Desai | G06F 16/172 |
| 2011/0016095 A1* | 1/2011 | Anglin | G06F 11/1453 707/692 |
| 2012/0278371 A1* | 11/2012 | Montalvo | G06F 16/182 707/827 |
| 2013/0041872 A1* | 2/2013 | Aizman | G06F 16/182 707/690 |
| 2014/0040205 A1* | 2/2014 | Cometto | G06F 9/4411 707/639 |
| 2017/0212691 A1* | 7/2017 | Katsuki | G06F 3/0619 |
| 2017/0286698 A1* | 10/2017 | Shetty | H04L 63/0471 |
| 2017/0346625 A1* | 11/2017 | Yan | G06F 16/1756 |
| 2018/0034819 A1* | 2/2018 | Yan | H04L 63/0428 |

* cited by examiner

*Primary Examiner* — Jau Shya Meng
(74) *Attorney, Agent, or Firm* — Womble Bond Dickinson (US) LLP

(57) ABSTRACT

Methods and systems for serverless data deduplication are disclosed. A blob of data is received at a cloud services platform, where the blob of data includes incremental data. The blob of data is used to create an object in a first object store included in the cloud services platform. A function as a service (FaaS) function is triggered when the object is created. The FaaS function deduplicates the object to generate a deduplicated object. The deduplicated object is stored in a second object store included in the cloud services platform.

19 Claims, 8 Drawing Sheets

METHODS AND SYSTEMS FOR SERVERLESS DATA DEDUPLICATION

FIELD OF THE INVENTION

Embodiments of the present invention relate generally to data deduplication. More particularly, embodiments of the invention relate to methods and systems for serverless data deduplication.

BACKGROUND

Data deduplication is a process by which a data storage system can detect multiple identical copies of data and only keeps a single copy of that data, thus eliminating the redundant data by preventing identical copies from being stored, thereby improving storage utilization. Today, data deduplication is widely used for data backup since incremental backups taken in sequences have a large amount of data commonality. While a data deduplication system can be run on cloud services platforms, such as Amazon Web Services (AWS), Microsoft Azure, IBM Bluemix, and the like, such solution however is limited in scale and performance, and is very expensive.

Function as a service (FaaS) refers to as a category of cloud computing services that provides a platform allowing customers to develop, run, and manage application functionalities without the complexity of building and maintaining the infrastructure typically associated with developing and launching an application. Building an application using FaaS is one way of achieving a "serverless" architecture. FIG. 1 illustrates a conventional FaaS-based system in which consumers generally run data deduplication services. In FIG. 1, system 100 includes an object store 101, a database 103 (e.g., structured query language (SQL) database), and a database 105 (e.g., document database such as MongoDB). With continued reference to FIG. 1, an action (e.g., an insertion of an object into object store 101) triggers a first function call 102 that processes the inserted object. Information from the processed object is then stored in database 103, which invokes a second function call 104. The second functional call 104 queries and processes the information stored in database 103, and stores the processed information as documents in database 105. Storing the information in database 105 invokes a third function call 106 that executes a cognitive algorithm in a cloud services platform 107, such as IBM Bluemix, Currently, there are different FaaS-based compute services including AWS Lambda, Google Firebase, Microsoft Azure, IBM OpenWhisk, and the like. For consumers, the disparity and difference choices of such compute services present a wide variety of problems. For example, conventional data deduplication systems running on a cloud services platform require a relatively expensive machine. Such machine generally causes the computing cost to be a significant factor of the solution cost, and independent on the amount of data digested or processed on the daily basis. Moreover, the conventional data deduplication systems that run on the cloud services platform are very expensive due to the use of block level storage, such as AWS Elastic Block Store (EBS). Although there is a solution that is more cloud native and microservices-based, the solution however requires provisioning of a large amount of computing resources in advance on the cloud computing platform, which can be more expensive than the storage solution.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
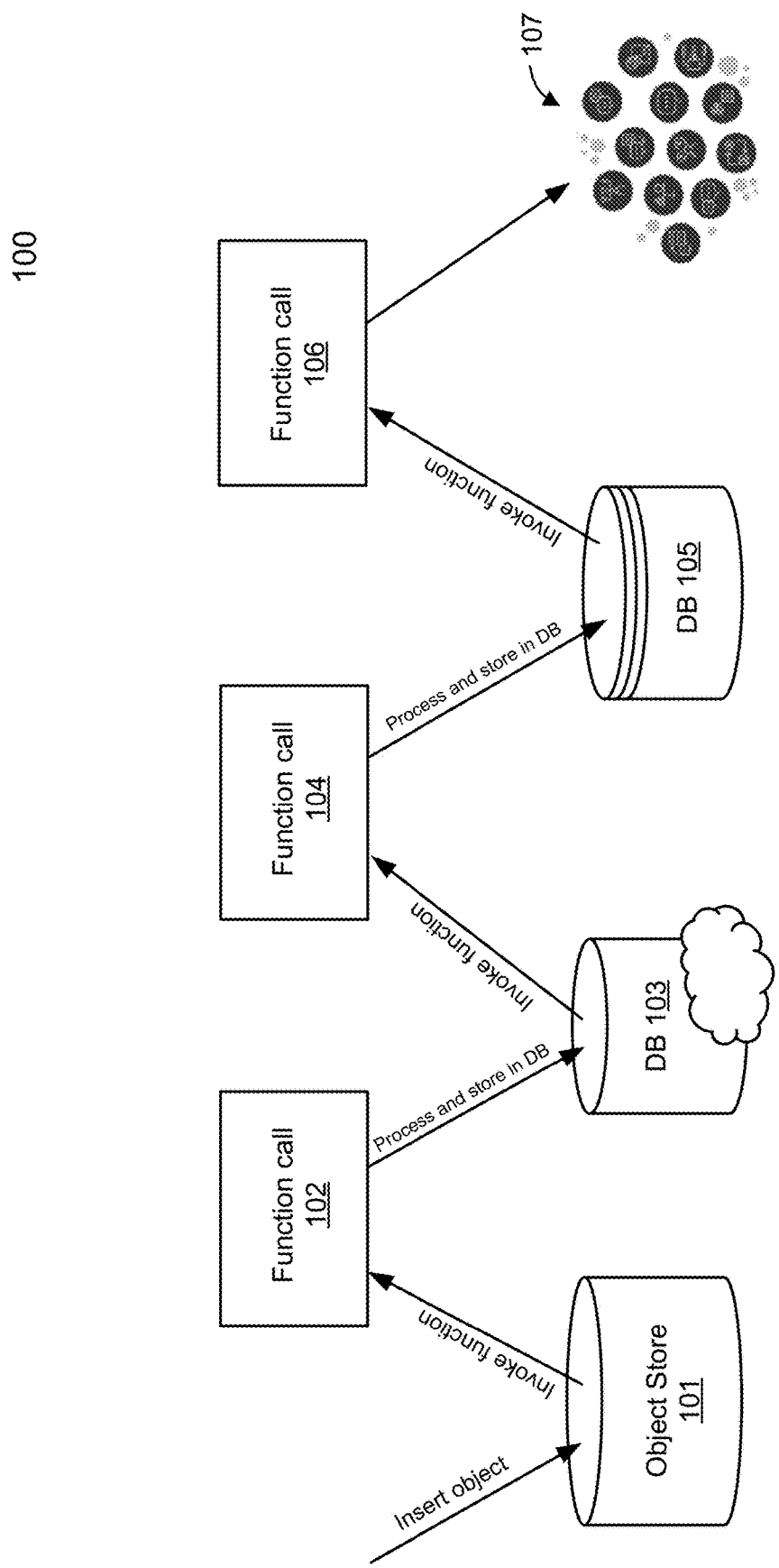
FIG. 1 is a block diagram illustrating a conventional function as a service (FaaS) system.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

Embodiments of the disclosure are related to creating data deduplication as a service in a cloud services platform using FaaS. This means that a user will need to pay for the storage consumed and database services for storing metadata, but the compute will only be charged when data is ingested for backup. There are solutions today that provide deduplication capabilities in the cloud services platform. However, these solutions do not make use of the emerging technology of serverless functions, and usually are a lift-and-shift implementation of similar solutions migrated from on premise environments into the cloud services platform. Utilizing FaaS for data deduplication using various cloud services provides cost savings since the pricing model of the cloud services platform is optimized.

According to one embodiment, methods and systems for serverless data deduplication are disclosed. A blob of data is received at a cloud services platform, where the blob of data includes incremental data. The blob of data is used to create an object in a first object store included in the cloud services platform. A function as a service (FaaS) function is triggered when the object is created. The FaaS function deduplicates the object to generate a deduplicated object. The deduplicated object is stored in a second object store included in the cloud services platform.

In one embodiment, to deduplicate the object, the object is divided into a number of data pieces. For each of the data pieces, a corresponding hash value that identifies the data piece is created. Whether the hash value is in existence is determined. In response to determining that the hash value is in existence, the corresponding data piece is replaced with a pointer to a data location of the data piece. Otherwise in response to determining that the hash value is not in existence, the data piece is preserved and the hash value is added to a key value pair with an object identifier (ID) of the deduplicated object, where the preserved data piece is included in the deduplicated object.

Figure 2:
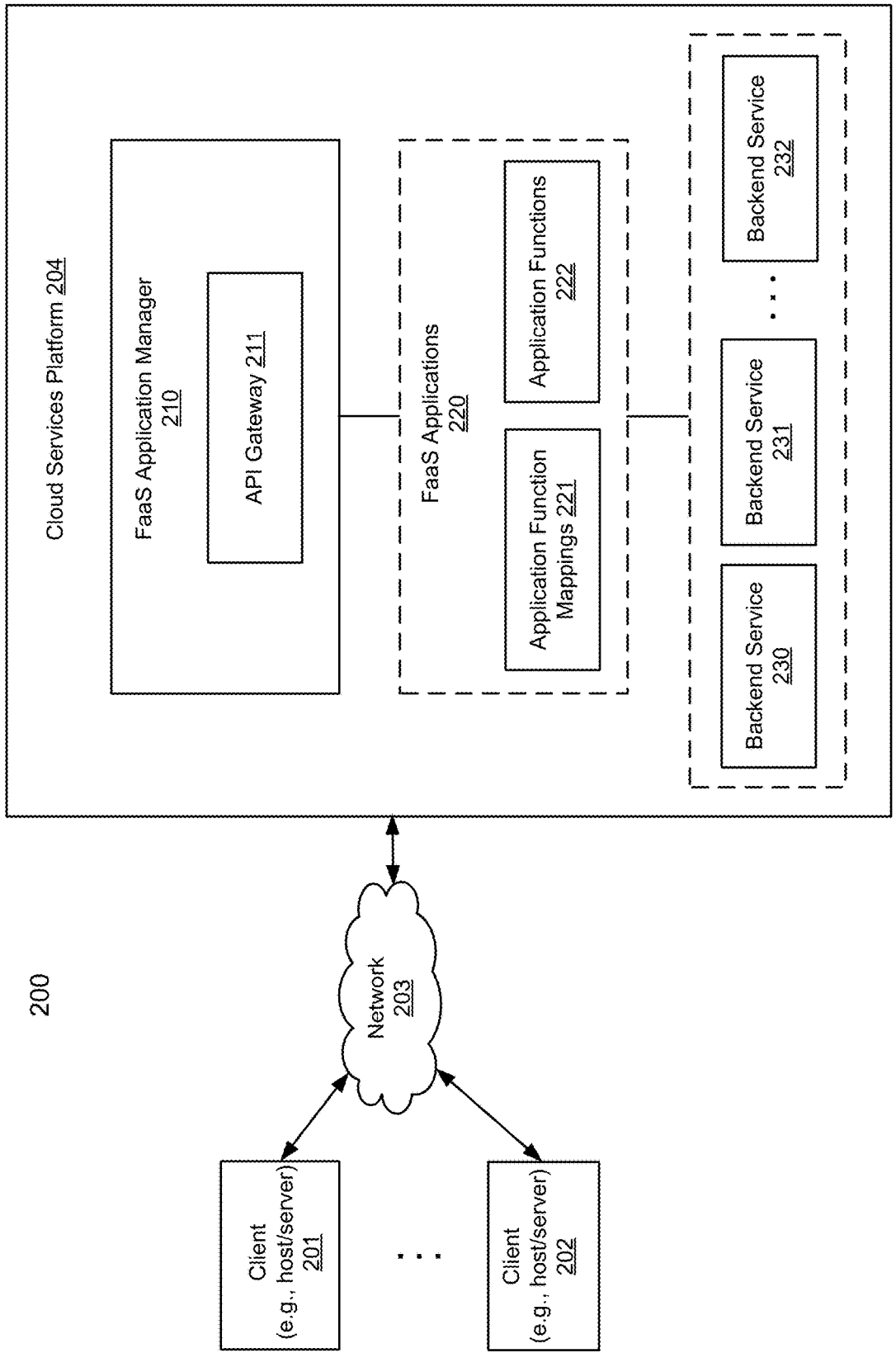
FIG. 2 is a block diagram illustrating a serverless-based system according to one embodiment.

FIG. 2 is a block diagram illustrating a serverless-based system according to one embodiment. Referring to FIG. 2, system 200 includes, but is not limited to, one or more client systems 201-202 communicatively coupled to cloud services platform 204 over network 203. Clients 201-202 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 201-202 may be a primary storage system (e.g., local data center) that provides storage to other local clients, which may periodically back up the content stored therein to a backup storage system (e.g., a disaster recovery site or system). Network 203 may be any type of networks such as a local area network (LAN), a wide area network (WAN) such as the Internet, a fiber network, a storage network, a cellular network, or a combination thereof, wired or wireless. Clients 201-202 may be in physical proximity or may be physically remote from one another.

With continued reference to FIG. 2, cloud services platform 204 may implement computing services on behalf of respective cloud infrastructure tenants, with each tenant corresponding to one or more users associated with respective clients 201-202. By way of example, the computing services may include execution of one or more serverless applications on behalf of each of the users associated with respective clients 201-202, although it should be understood that illustrative embodiments are not limited to serverless applications, but are more generally applicable to any applications that execute at least in part within a FaaS environment. Accordingly, cloud services platform 204 may implement at least a portion of the FaaS environment accessible to clients 201-202 over network 203.

In one embodiment, cloud services platform 204 may be implemented as part of a cloud infrastructure in the form of a cloud-based system, such as an Amazon Web Services (AWS) system. Other examples of cloud-based systems that can be used to provide at least portions of the cloud services platform 204 and possibly other portions of system 200 include Google Cloud Platform (GCP) and Microsoft Azure. As a more particular example, the cloud services platform 204 may be configured to implement a serverless application architecture similar to the AWS Lambda serverless application architecture.

These and other serverless application architectures referred to herein allow users to build and run applications without the need to provision, maintain or otherwise manage any servers. Although a given cloud services platform implementing such an architecture may include servers, the applications are referred to as "serverless" in that the applications can be run and scaled without user reference to any particular server or servers and the user is therefore relieved of any server-related issues. The term "serverless" should therefore not be construed as indicating that a cloud services platform or other processing platform that executes a given serverless application cannot include any servers. In various embodiments, advantages of serverless application architectures include scalability and reduced operational costs as well as finely-grained metering of computing services actually utilized by platform users.

Again, references herein to serverless applications are intended as examples of applications that may be executed in the FaaS environment. Other types of applications can be executed in the FaaS environment in other embodiments. A serverless architecture refers to applications that are packaged as stateless ephemeral containers that respond to external events and interact with backend services. Serverless architectures are becoming extremely popular because they can reduce an organization's or enterprise's operational cost (e.g., pay only when executing) and can be easily scaled. One example of a cloud vendor host that offers a platform for such applications is Amazon via AWS Lambda. Examples of other cloud vendors providing platforms for serverless applications and functions include Google and Microsoft.

Still referring to FIG. 2, cloud services platform 204 may include FaaS application manager 210, serverless or FaaS applications 220, and backend services 230-232. FaaS applications 220 may include three types of artifacts that are required for it to operate in production, namely backend services 230-232, application functions 222, and application function mappings 221. Backend services 230-232 are referred to as databases, object stores, persisted messaging services, or other type of service that can store long term state for the application. Examples of backend services 230-232 include, but not limited to, AWS S3, DynamoDB, Aurora, or an Oracle database, among others.

Application functions 222 are referred to a set of stateless functions packaged as containers that will be invoked according to the application function mappings 221. The application functions 222 can interact with the backend services 230-232 to read and store state. An example of an application function includes a script that reads a photo from an S3 logical storage bucket and creates a thumbnail for it.

Application function mappings 221 may specify the conditions under which the application functions 222 are invoked. More specifically, a serverless application requires set of conditions that instruct the platform 204 to activate the application functions 222. Examples include reactions to events or operations of backend services 230-232 (e.g., object uploaded to an S3 bucket, object deleted from an S3 bucket, transaction committed on a relational database, message has been sent to a queue or assigned uniform resource locator (URL) endpoint (e.g., when a post request arrives at my-app-dns/my-app-api/data)). Conditions could be simple or include more complex filters. In addition, application functions can directly invoke other functions (downstream functions).

In one embodiment, a FaaS application is configured to implement a continuous data protection solution for a particular business, enterprise, or other organization. It should be appreciated that the cloud services platform 204 of FIG. 2 and other processing platforms referred to herein are each implemented using a number of processing devices, with each device having a processor coupled to a memory. Such processing devices can illustratively include particular arrangements of compute, storage and network resources. For example, processing devices in some embodiments are implemented at least in part utilizing virtual resources, such as virtual machines (VMs) or Linux containers (LXCs), or combinations of both as in an arrangement in which Docker containers or other types of LXCs are configured to run on VMs.

The FaaS application manager 210 may be configured to receive a request to execute one of the FaaS applications 220 and to initiate execution of the FaaS application responsive to the request. The request initiating execution of the FaaS application may be received in an application programming interface (API) gateway 111 of the FaaS application manager 110 from one of the clients 201-202 over network 203. The request to initiate execution of the FaaS application may also be triggered by particular events, such as the creation of an object in an object store bucket, an operation on a database (e.g., insertion of an entry), URL access, and many other different types of events. As noted above, the FaaS applications 220 in some cases include serverless applications executed by the cloud services platform 204 in accordance with a FaaS model.

In one embodiment, any of the FaaS applications 220 may be executed in the cloud services platform 204 under the control of the FaaS application manager 210 illustratively includes one or more application function mappings 221 and one or more application functions 222, and utilizes one or more backend services 230-232. Accordingly, FaaS application manager 210 may utilize application function mappings 221 to invoke application functions 222, with each application function interacting with one or more backend services 230-232 in executing the FaaS application.

In one embodiment, each of application function mappings 221 may specify one or more conditions under which particular ones of the application functions 222 are invoked. For example, the conditions specified by the application function mappings 221 may include respective events, with each event relating to one or more of the backend services 230-232.

These and other conditions may instruct the cloud services platform 204 to activate the corresponding instances of the application functions 222. As discussed, examples of conditions that may be part of the application function mappings 221 may include an object being uploaded to an AWS S3 bucket, a transaction being committed on a relational database, and a message being sent to a queue. Other example conditions relate to events associated with designated URL endpoints. For example, one possible condition can be an event defined as a POST request arriving at a URL endpoint denoted my-app-dns/my-app-api/data. These and other conditions of this type not only indicate when to execute the application functions, but also map particular endpoints to certain application functions. The various conditions that may be specified by the application function mappings 214 can include simple conditions as well as more complex conditions each based on filtering of multiple simpler conditions.

In one embodiment, each of application functions 222 may be executed in one or more stateless ephemeral containers of the cloud services platform 204. Such containers may include Docker containers or other types of LXCs. The containers may be configured to respond to external events and to interact with backend services 230-232. The application functions 222 may include stateless functions packaged as containers that will be invoked according to the conditions specified in one or more application function mappings 221. The application functions 222 may interact with one or more of the backend services 230-232 to read and store data using those backend services. For example, an application function may include a script (e.g., Python script) that reads an image from an AWS S3 object store and creates a thumbnail for it.

In one embodiment, backend services 230-232 may include a database service, an object storage service and a message processing service, although a wide variety of additional or alternative services can be supported in the cloud services platform 204. For example, backend services 230-232 may include AWS S3, GCP Cloud Storage, Microsoft Azure Blob Storage, DynamoDB, MongoDB, Amazon Aurora and Oracle database. Although the backend services 230-232 are shown as part of the cloud services platform 204, at least a subset of these backend services in other embodiments may be implemented on another processing platform that is accessible to the cloud services platform 204 over one or more networks.

Figure 3:
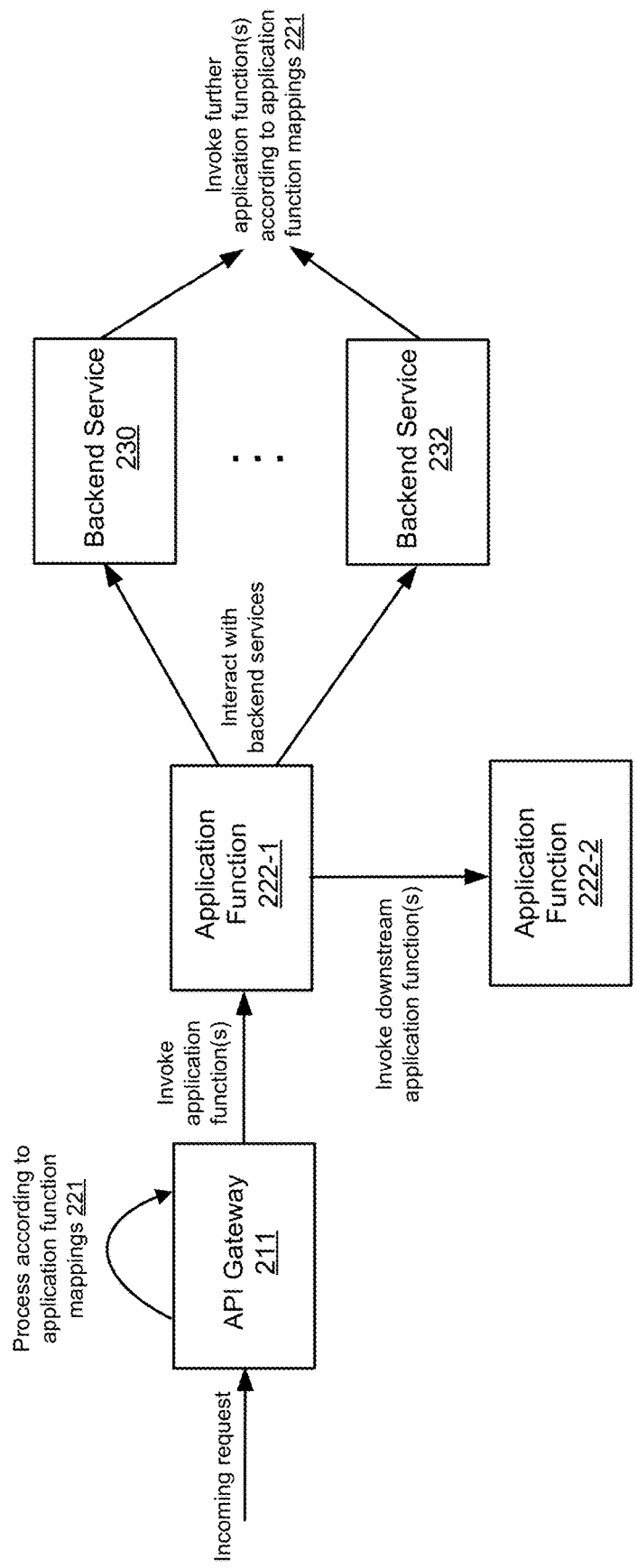
FIG. 3 is a block diagram illustrating a cloud services platform according to one embodiment of the invention.

FIG. 3 is a block diagram illustrating a cloud services platform 300 according to one embodiment of the invention. In some embodiments, cloud services platform 300 may be implemented as part of cloud services platform 204 of FIG. 2. Referring to FIG. 3, cloud services platform 300 may include API gateway 211, application functions 222, and backend services 230-232.

With reference to FIG. 3, an incoming request to initiate execution of an application (e.g., one of FaaS applications 220 under the control of FaaS application manager 210) is received in API gateway 211 of FaaS application manager 210. In one embodiment, the request may include a Hypertext Transfer Protocol (HTTP) request received in cloud services platform 204 from clients 201-202 over network 203. In one embodiment, the request may be processed by the FaaS application manager 210 using one or more application function mappings 221 that are determined to be associated with the request. Based on the processing in accordance with application function mappings 221, API gateway 211 may invoke one or more application functions 222. It should be noted that while FIG. 2 illustrates application functions 222-1 and 222-2, any number of application functions may exist in cloud services platform 300.

With continued reference to FIG. 3, an instance of application function 222-1 may be instantiated by FaaS application manager 210 using a corresponding up-to-date container image, where the instantiated application function 222-1 may interact with backend services 230-232. In one embodiment, each of the backend services 230-232 may invoke additional application functions, for example from application functions 222, in accordance with application function mappings 221, or a particular application being executed. In one embodiment, application function 222-1 may invoke another or downstream application function (e.g., application function 222-2).

Figure 4:
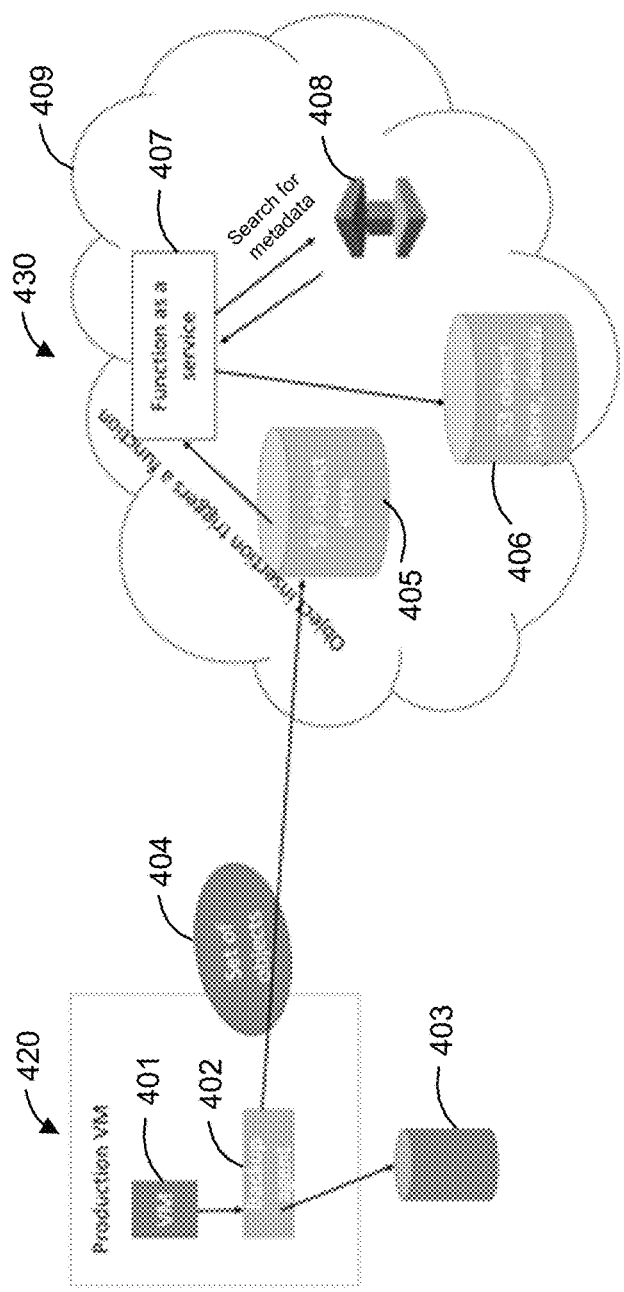
FIG. 4 is a block diagram illustrating a serverless-based data deduplication system according to one embodiment.

FIG. 4 is a block diagram illustrating a serverless-based data deduplication system according to one embodiment. In FIG. 4, system 400 may include a production site 420 coupled (or connected) to a deduplication site 430 over a network (e.g., network 203 of FIG. 2). In one embodiment, production site 420 may represent (or include) one or more client systems, such as clients 201-202 of FIG. 2. In one embodiment, deduplication site 430 may include a cloud services platform 409, which may be cloud services platform 204 of FIG. 2 in some embodiments. The cloud services platform 409 may include an object store 405, deduplicated object store 406, a FaaS application 407, and data store (or cache) service 408.

With continued reference to FIG. 4, production site 420 may include a virtual machine (VM) 401 (e.g., production VM), backup agent 402 (e.g., daemon or microservice), and data store 403 (e.g., a database). Although not shown in FIG. 4, in one embodiment production site 420 may include a storage area network (SAN) that provides access to consolidated block level data storage. In one embodiment, VM 401 may be hosted by a client system (e.g., clients 201-202), where VM 401 writes data to data store 403. In one embodiment, backup agent 402 may collect a blob (or chunk) of data for backup, where the blob of data may include incremental data (i.e., data changes). For example, backup agent 402 may be implemented as a driver, daemon, or microservice installed on the client system. The backup agent 402 may be disposed on a data path between VM 401 and data store 403 that is to be deduplicated. In one embodiment, backup agent 402 may aggregate inputs/outputs (IOs), i.e., data received and/or data sent, to obtain the blob of data, compress the blob of data, and/or send the blob of data to object store 405, which may be in the form of an object (e.g., S3 object) or a set of objects 404 in some embodiments. In one embodiment, backup agent 402 may add metadata to the blob of incremental data prior to sending the data to the object store 405.

In other words, the backup agent 402 is responsible for intercepting writes to the data store 403 (e.g., block device), augmenting multiple writes together to form a blob of incremental data, and generating, adding, or otherwise obtaining for each write metadata, for example, describing the write offset and size of the write. Once the set of objects 404 exceeds a threshold size, the objects are sent to the object store 405. While the backup agent 402 can send the set of objects 404 of any size, it is generally undesirable to send a single tarball or tarfile as FaaS application 407 works with relatively small objects (e.g., no more than 50 or 100 megabytes) so that deduplication can be achieved with a single function call.

In one embodiment, the object store 405 is an AWS S3 object store having buckets that store objects. A bucket refers to a logical unit of storage. Each object may include data (e.g., blob of incremental data as previously described), a key or identifier, and object metadata. The object key (or key name) uniquely identifies the object in a bucket. Object metadata is a set of name-value pairs. Object metadata may be set at the time the object is uploaded into the bucket. Generally, after the object has been uploaded, the object metadata cannot be modified. Examples of object metadata include object creation date and object size.

Object storage refers to a storage model used to organize and manage units of storage, i.e., objects. An object includes the data content itself, metadata, and an object identifier or key. The data may include files, photos, videos, documents, and so forth. The metadata includes contextual information about the data. The object identifier is a globally unique identifier or address that is assigned to the object in order for the object to be found over a distributed system.

In some embodiments, an advantage of object storage is that the metadata to be associated with an object is customizable and there is generally no limit on the type or amount of metadata that may be associated with the object. Another advantage of object storage is its scalability. There can be durability issues, hard limitations with the storage infrastructure, increased overhead and so forth when trying to expand block-based storage such as beyond a hundred terabytes or multiple petabytes. Object-based storage architectures, however, can generally be scaled out and managed simply by adding additional storage nodes. The flat name space organization of the data, in combination with its expandable metadata functionality, facilitates this ease of use. Object storage can also be much less expensive than block storage.

However, in some embodiments, an advantage of block storage is that a file can be incrementally edited. With block storage, files are split into evenly sized blocks of data, each with its own address. In object storage, objects are generally manipulated as a whole unit in which the entire object is accessed, updated, and re-written, as required, in their entirety. This can have performance implications for data that is frequently written and accessed. Further, block storage can be accessed directly by an operating system as a mounted drive volume; whereas with object storage, there can be a degradation in performance as compared to block storage. Block storage is generally considered to be strongly consistent; whereas object storage is generally considered to be eventually consistent.

Still referring to FIG. 4, in one embodiment, a FaaS function of FaaS application 407 is triggered (e.g., using CloudWatch alarms in AWS, or equivalent services in other cloud services platforms) when an object (e.g., from the set of objects 404) is received and inserted into object store 405, or IOs are received and created as objects in object store 405. The FaaS function, in one embodiment, may replace the object with a deduplicated version of the object stored in deduplicated object store 406. In doing so, the object data may be divided into variable length (or same length) data pieces (i.e., multiple variable or same length data parts) based on a division algorithm. For each data piece, a corresponding hash value (e.g., SHA-1 20-byte hash) may be created, where the hash value identifies the data piece. A key value store (e.g., Amazon DynamoDB, Azure Cosmos DB, or the like) may be visited to obtain the hash value as a key and an object identifier (ID) included in the key value store. The key and object ID uniquely identify the object in a bucket. That is, the key and object ID may be utilized to identify the data corresponding to the hash value. In one embodiment, the FaaS function determines which of the data pieces are in existence, for example, in another object (i.e., already existing in another object) in object store 406, and replaces such data pieces with a data hash signature. For example, in one embodiment, if a hash value does not exist in the key value store, the hash value may be added to a key value pair with the object ID of a new object (e.g., deduplicated object). Data pieces of the object with a hash value already exist may be replaced with a pointer to a real (or physical) data location. Data pieces of the object with a hash value that does not exist may be preserved, thereby achieving significant deduplication. As a result, the data pieces with a nonexistence hash value and/or the pointer may be stored as a deduplicated object in object store 406, while the original object in object store 405 may be deleted or discarded. In one embodiment, data cache service 408 (e.g., Amazon ElastiCache or an equivalent service) may be utilized to accelerate application workloads (e.g., FaaS application 407) by caching data (or objects) in deduplicated object store 406 in-memory that may provide sub-millisecond data retrieval performance. When used in conjunction with object store 406, data cache service 408 can alleviate the pressure associated with heavy request loads, increase overall application performance and reduce costs associated with scaling for throughput on other object stores (or databases).

In some embodiments, under normal operation, the production site 420 is the source-side of the system and the deduplication site 430 is the target-side of the system. The deduplication site 430 may be responsible for deduplicating production site data. Additionally, the deduplication site 430 may enable rollback of production site data to earlier points in time, which may be used in the event of data corruption of a disaster or to view or to access data from an earlier point in time. In one embodiment, the production site 420 and deduplication site 430 are remote from each other. In another embodiment, the sites may both be located at a common site, local to one another. Local data protection has the advantage of minimizing data lag between the target and source, and remote data protection has the advantage of being available in the event a disaster occurs at the source side.

In some embodiments, VM 401 may run a data processing application such as a database application or an email server and issue IO requests (e.g., write/read operations) to the data store (or volume) 403. The data store 403 may be a virtual machine data store or any other type of data store. The data store 403 may be associated with a storage array having a set of block devices for storage. A block device is a piece of hardware that can be used to store data. Examples of block devices include traditional spinning hard disk drives (HDDs) and solid state drives (SSDs). These components are referred to as block devices because the OS kernel interfaces with the hardware by referencing fixed-size blocks, or chunks of space. For example, IOs are generally transmitted to the volume with an address that includes the volume, an offset within the volume, and a data size. Thus, a write IO of 10 kilobytes (KB), for example, would have write size of 20 blocks in a volume with a 512-byte block size alignment.

In one embodiment, to read (or access) an object (e.g., from deduplicated object store 406), another FaaS function may be triggered. For example, the FaaS function may invoke an API to read a value from a hash (or hash value), or an API to read a full object. When reading the object, the FaaS function may determine which data pieces of the object were replaced by hashes and fetch the data pieces from their actual location. In some embodiments, the cost for accessing data is based on per transaction. It is also ultra-scalable and millions of objects can be fetched simultaneously, thereby causing significant performance boost.

In one embodiment, in order to perform garbage collection there may be a process that runs garbage collection periodically, for example every two weeks. As such, for example, each hash value, its associated object, and timestamp may be placed in a database. Then, map reduction may be used to determine which data is no longer relevant, for example, after a particular date. Once the irrelevant data is determined, all objects can be traversed to remove duplicate data (and also merging of objects).

Figure 5:
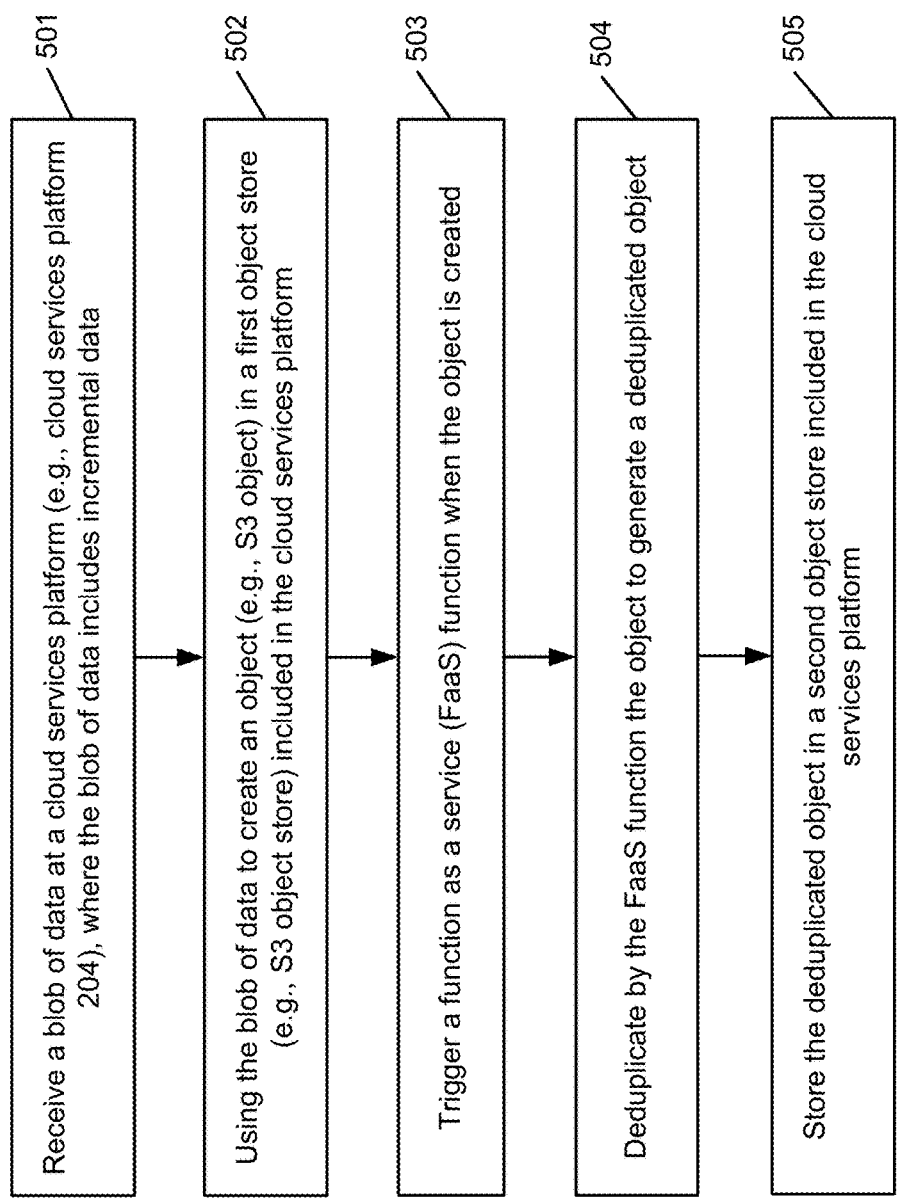
FIG. 5 is a flow diagram illustrating a method of serverless data deduplication according to one embodiment.

FIG. 5 is a flow diagram illustrating a method of serverless data deduplication according to one embodiment. Process 500 may be performed by processing logic that includes hardware (e.g. circuitry, dedicated logic, etc.), software (e.g., embodied on a non-transitory computer readable medium), or a combination thereof. For example, process 500 may be performed by cloud services platform 204 of FIG. 2.

Referring to FIG. 5, at block 501, the processing logic receives a blob of data at a cloud services platform (e.g., cloud services platform 204), wherein the blob of data includes incremental data. At block 502, the processing logic uses the blob of data to create an object (e.g., S3 object) in a first object store (e.g., S3 object store) included in the cloud services platform. At block 503, the processing logic triggers a FaaS function when the object is created. The FaaS function (at block 504) deduplicates the object to generate a deduplicated object. At block 505, the processing logic stores the deduplicated object in a second object store (e.g., a deduplicated S3 object store) included in the cloud services platform, and in some embodiments, the original object (e.g., the created object in the first object store) may be deleted.

Figure 6:
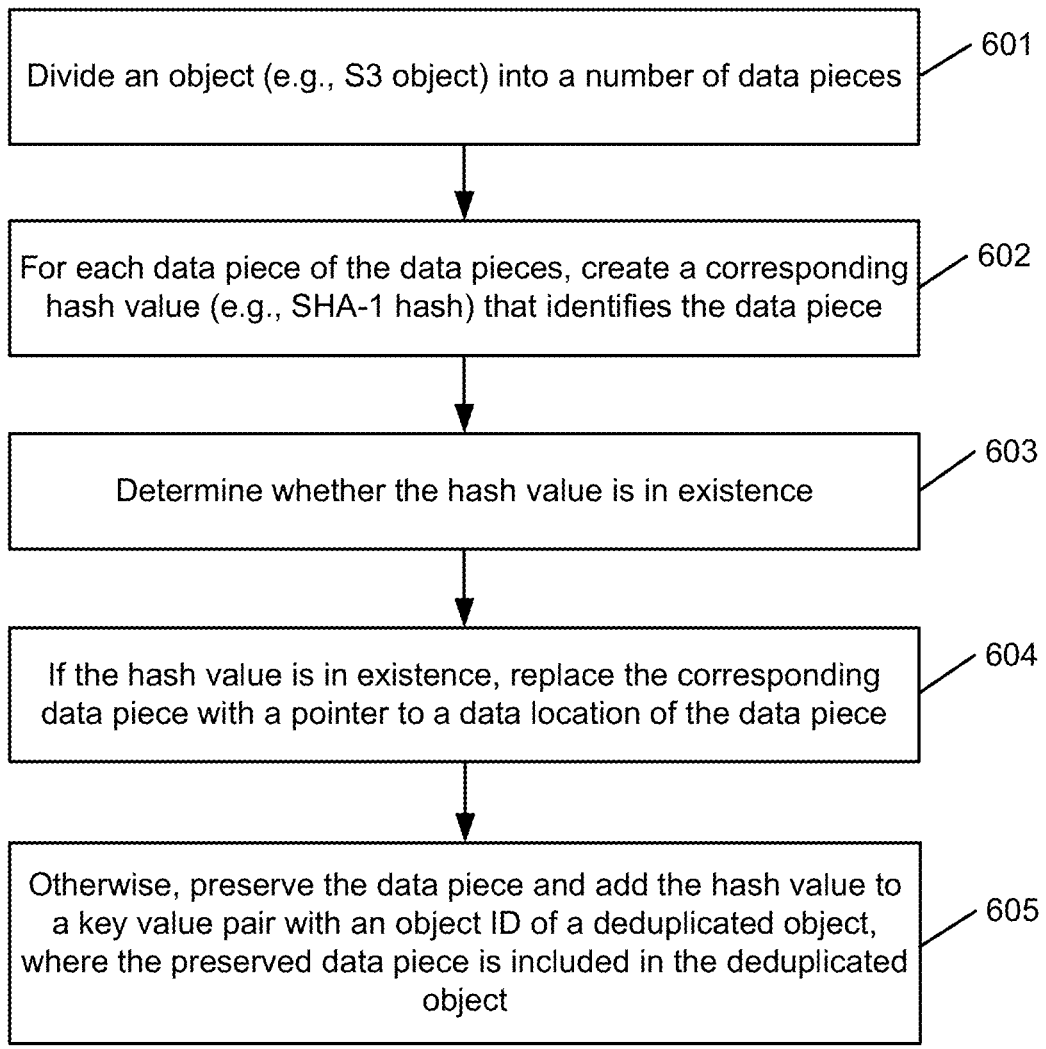
FIG. 6 is a flow diagram illustrating another method of serverless data deduplication according to one embodiment.

FIG. 6 is a flow diagram illustrating another method of serverless data deduplication according to one embodiment. Process 600 may be performed by processing logic that includes hardware (e.g. circuitry, dedicated logic, etc.), software (e.g., embodied on a non-transitory computer readable medium), or a combination thereof. For example, process 600 may be performed by cloud services platform 204 of FIG. 2. In particular, process 600 may be performed as part of block 504 of FIG. 5.

Referring to FIG. 6, at block 601, the processing logic divides an object (e.g., S3 object) into a number of data pieces. At block 602, the processing logic, for each data piece of the data pieces, creates a corresponding hash value (e.g., SHA-1 hash) that identifies the data piece. At block 603, the processing logic determines whether the hash value is in existence. If the hash value is in existence, at block 604, the processing logic replaces the corresponding data piece with a pointer to a data location of the data piece, which in one embodiment may be stored in a key value store as previously described. Otherwise if the hash value is not in existence, at block 605, the processing logic preserves the data piece and adds the hash value to a key value pair with an object ID of a deduplicated object, where the preserved data piece is included in the deduplicated object.

Figure 7:
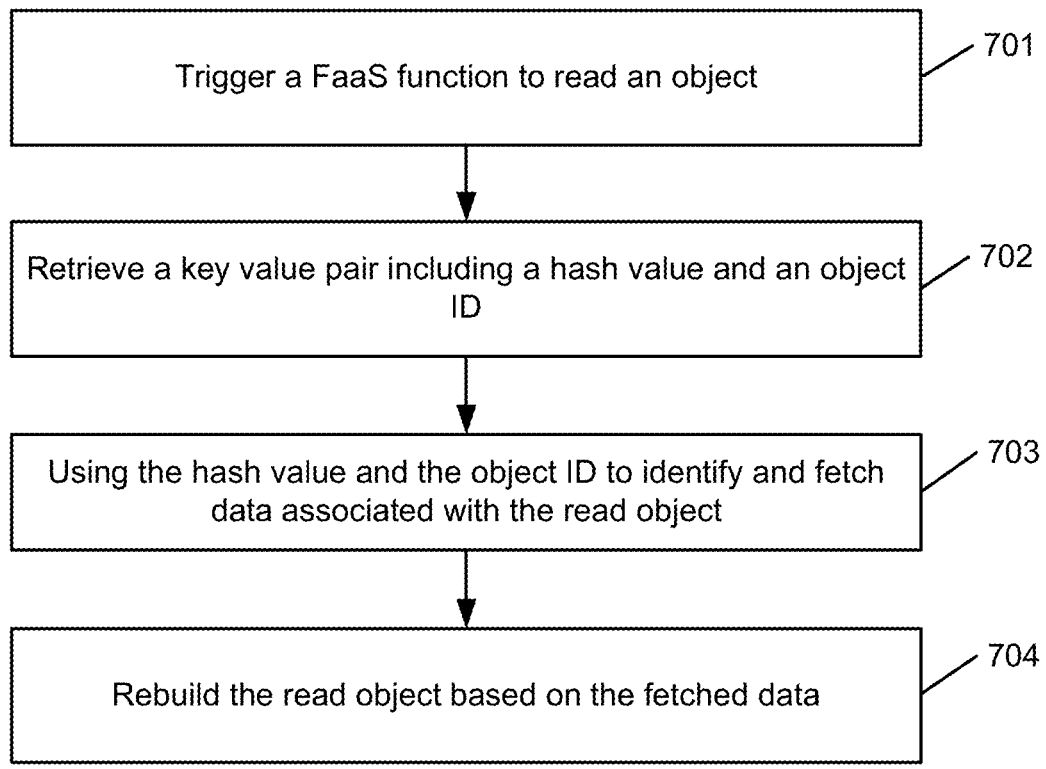
FIG. 7 is a flow diagram illustrating a method of restoring an object according to one embodiment.

FIG. 7 is a flow diagram illustrating a method of restoring an object according to one embodiment. Process 700 may be performed by processing logic that includes hardware (e.g. circuitry, dedicated logic, etc.), software (e.g., embodied on a non-transitory computer readable medium), or a combination thereof. For example, process 700 may be performed at production site 420 of FIG. 4, or clients 201-202 of FIG. 2.

Referring to FIG. 7, at block 701, the processing logic may trigger a FaaS function to read an object, for example, in response to a request to restore the object or data pieces associated with the object. At block 702, the processing logic may retrieve a key value pair including a hash value and an object ID. For example, the processing logic may visit the key value store to search and obtain such key value pair based on a key value pointer. At block 703, the processing logic uses the hash value and the object ID to identify and fetch data associated with the read object. For example, the object ID may identify a deduplicated object stored in deduplicated object store 406 of FIG. 4. The deduplicated object may include the data associated with the read object, where the data is identified by the hash value. In some embodiments, the data may be an actual data piece of the read object or a pointer to a data location of a data piece, where the pointer may be stored in another key value store. At block 704, the processing logic rebuilds the read object based on the fetched data. In one embodiment, the processing logic may further determine if the rebuild is complete (e.g., the read object is fully reconstructed). If so, process 700 ends. Otherwise if the rebuild is incomplete, the processing logic may repeat steps 701-704. Once the object is rebuilt or reconstructed, it may be restored, for example, at production site 420 of FIG. 4 for access.

Note that some or all of the components as shown and described above (e.g., cloud services platform 204) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
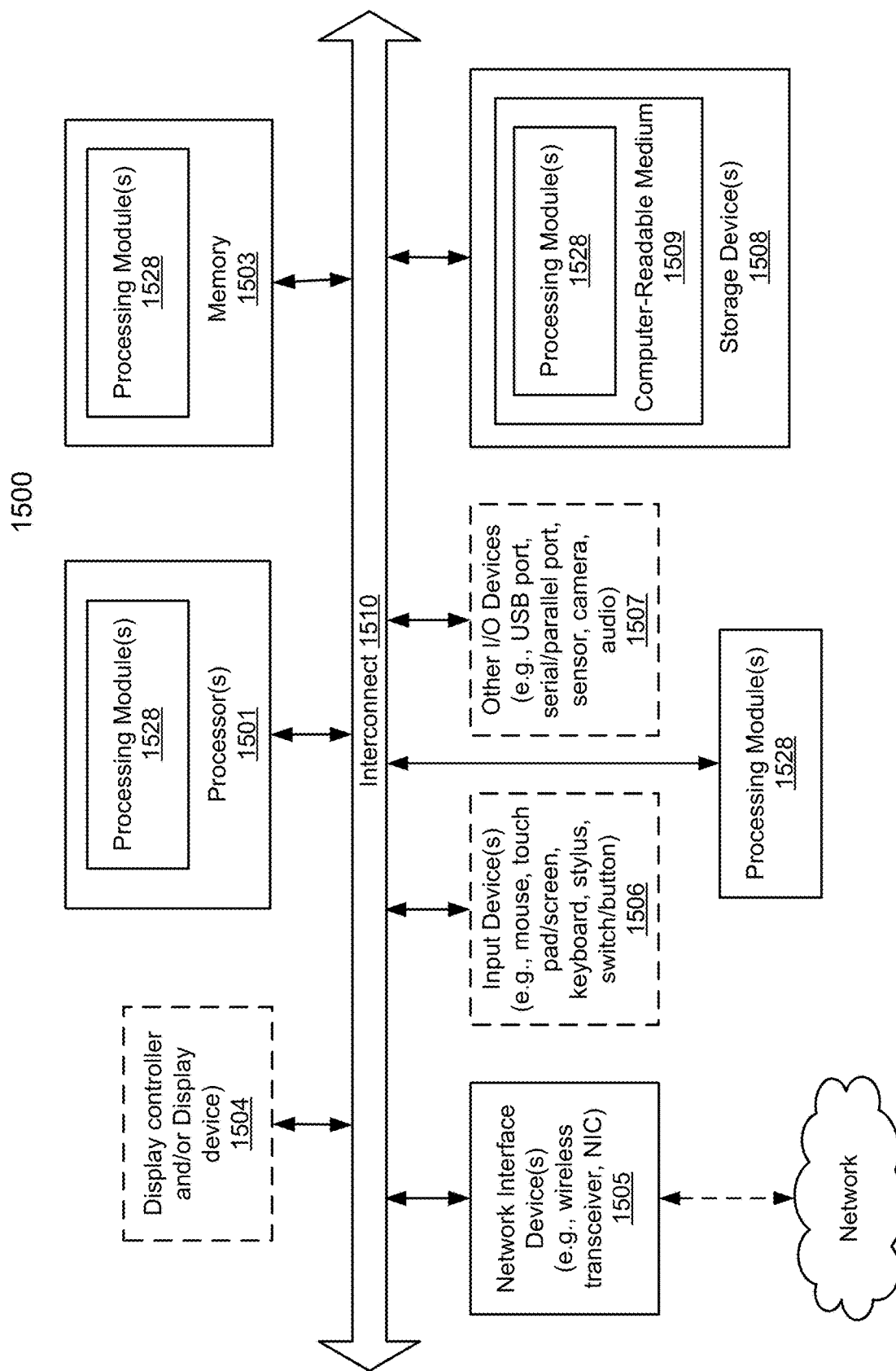
FIG. 8 is a block diagram illustrating a data processing system according to one embodiment.

FIG. 8 is a block diagram illustrating an example of a data processing system which may be used with one embodiment of the invention. For example, system 1500 may represents any of data processing systems described above performing any of the processes or methods described above. In one embodiment, system 1500 may be implemented as part of clients 201-202. In another embodiment, system 1500 may execute the cloud services platform 204 of FIG. 2. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for function as a service (FaaS) based data deduplication, the method comprising:

receiving a blob of data as a set of cloud-based objects in a cloud services platform, wherein the blob of data includes incremental data;

for each object in the set of cloud-based objects,
inserting the object into a first cloud-based object store included in the cloud services platform,
triggering, in the cloud services platform, a FaaS-based data deduplication function in response to the insertion of the object, to deduplicate the object in the cloud services platform,
deduplicating the object in the cloud services platform to generate a deduplicated object, and
storing the deduplicated object in a second cloud-based object store included in the cloud services platform;

wherein deduplicating the object in the cloud services platform comprises:
dividing the object into a plurality of data pieces,
for each of the data pieces,
creating a corresponding hash value for the data piece,
visiting a cloud-based database service of the cloud services platform to obtain the hash value, as a key, and an object identifier (ID) that uniquely identifies data corresponding to the hash value,
determining whether the hash value is in existence in the cloud-based database service,
in response to determining that the hash value is in existence in the cloud-based database service, replacing the corresponding data piece with a pointer to a data location of the data piece,
otherwise in response to determining that the hash value is not in existence in the cloud-based database service, preserving the data piece and adding the hash value to a key value pair with an object ID of the deduplicated object, wherein the preserved data piece is included in the deduplicated object.

2. The method of claim 1, wherein the set of cloud-based objects comprises Amazon Web Services (AWS) S3 objects.

3. The method of claim 2, wherein the data pieces are of variable length.

4. The method of claim 2, wherein the first and second cloud-based object stores are first and second AWS S3 buckets, respectively.

5. The method of claim 1, further comprising collecting by a backup agent the blob of data at a production site, wherein the backup agent is disposed on a data path between a virtual machine and a data store included in the production site.

6. The method of claim 1, further comprising deleting the created object in the first cloud-based object store.

7. A non-transitory machine-readable medium having instructions stored therein, which when executed by a processor, cause the processor to perform operations, the operations comprising:

receiving a blob of data as a set of cloud-based objects in a cloud services platform, wherein the blob of data includes incremental data;

for each object in the set of cloud-based objects,
inserting the object into a first cloud-based object store included in the cloud services platform,
triggering, in the cloud services platform, a function as a service (FaaS) based data deduplication function in response to the insertion of the object, to deduplicate the object in the cloud services platform,
deduplicating the object in the cloud services platform to generate a deduplicated object, and
storing the deduplicated object in a second cloud-based object store included in the cloud services platform;

wherein deduplicating the object in the cloud services platform comprises:
dividing the object into a plurality of data pieces,
for each of the data pieces,
creating a corresponding hash value for the data piece,
visiting a cloud-based database service of the cloud services platform to obtain the hash value, as a key, and an object identifier (ID) that uniquely identifies data corresponding to the hash value,
determining whether the hash value is in existence in the cloud-based database service,
in response to determining that the hash value is in existence in the cloud-based database service, replacing the corresponding data piece with a pointer to a data location of the data piece,
otherwise in response to determining that the hash value is not in existence in the cloud-based database service, preserving the data piece and adding the hash value to a key value pair with an object ID of the deduplicated object, wherein the preserved data piece is included in the deduplicated object.

8. The non-transitory machine-readable medium of claim 7, wherein the set of cloud-based objects comprises Amazon Web Services (AWS) S3 objects.

9. The non-transitory machine-readable medium of claim 8, wherein the data pieces are of variable length.

10. The non-transitory machine-readable medium of claim 8, wherein the first and second cloud-based object stores are first and second AWS S3 buckets, respectively.

11. The non-transitory machine-readable medium of claim 7, wherein the operations further comprise collecting by a backup agent the blob of data at a production site, wherein the backup agent is disposed on a data path between a virtual machine and a data store included in the production site.

12. The non-transitory machine-readable medium of claim 7, wherein the operations further comprise deleting the created object in the first cloud-based object store.

13. A data processing system, comprising:
a processor; and
a memory coupled to the processor to store instructions, which when executed by the processor, cause the processor to perform operations, the operations including:
receiving a blob of data as a set of cloud-based objects in a cloud services platform, wherein the blob of data includes incremental data;
for each object in the set of cloud-based objects,
inserting the object into a first cloud-based object store included in the cloud services platform,
triggering, in the cloud services platform, a function as a service (FaaS) based data deduplication function in response to the insertion of the object, to deduplicate the object in the cloud services platform,
deduplicating the object in the cloud services platform to generate a deduplicated object, and
storing the deduplicated object in a second cloud-based object store included in the cloud services platform;

wherein deduplicating the object in the cloud services platform comprises:
dividing the object into a plurality of data pieces,
for each of the data pieces,
creating a corresponding hash value for the data piece,
visiting a cloud-based database service of the cloud services platform to obtain the hash value, as a key, and an object identifier (ID) that uniquely identifies data corresponding to the hash value,
determining whether the hash value is in existence in the cloud-based database service,
in response to determining that the hash value is in existence in the cloud-based database service, replacing the corresponding data piece with a pointer to a data location of the data piece,
otherwise in response to determining that the hash value is not in existence in the cloud-based database service, preserving the data piece and adding the hash value to a key value pair with an object ID of the deduplicated object, wherein the preserved data piece is included in the deduplicated object.

14. The data processing system of claim 13, wherein the set of cloud-based objects comprises Amazon Web Services (AWS) S3 objects.

15. The data processing system of claim 14, wherein the data pieces are of variable length.

16. The data processing system of claim 14, wherein the first and second cloud-based object stores are first and second AWS S3 buckets, respectively.

17. The data processing system of claim 13, wherein the operations further include collecting by a backup agent the blob of data at a production site, wherein the backup agent is disposed on a data path between a virtual machine and a data store included in the production site.

18. The data processing system of claim 13, wherein the operations further include deleting the created object in the first cloud-based object store.

19. A computer-implemented method of restoring an object at a production site, the method comprising:
in response to a request to restore an object or data pieces associated with the object, triggering a function as a service (FaaS) based data restore function to read the object in a cloud services platform;
retrieving a key value pair including a hash value and an object identifier (ID) by visiting a cloud-based database service of the cloud services platform to search and obtain the key value pair based on a key value pointer;
using the hash value and the object ID to identify and fetch data associated with the read object, wherein the object ID identifies a deduplicated object that includes the data and the hash value identifies the data; and
rebuilding the read object based on the fetched data;
wherein the object is deduplicated in the cloud services platform by:
dividing the object into a plurality of data pieces,
for each of the data pieces,
creating a corresponding hash value for the data piece,
visiting the cloud-based database service of the cloud services platform to obtain the hash value, as a key, and an object ID that uniquely identifies data corresponding to the hash value,
determining whether the hash value is in existence in the cloud-based database service,
in response to determining that the hash value is in existence in the cloud-based database service, replacing the corresponding data piece with a pointer to a data location of the data piece,
otherwise in response to determining that the hash value is not in existence in the cloud-based database service, preserving the data piece and adding the hash value to a key value pair with an object ID of the deduplicated object, wherein the preserved data piece is included in the deduplicated object.

* * * * *